United States Patent [19]

Penney

[11] Patent Number: 5,231,489
[45] Date of Patent: Jul. 27, 1993

[54] MOIRE MEASUREMENT SYSTEM USING SPECTRAL ANALYSIS

[75] Inventor: Bruce J. Penney, Portland, Oreg.

[73] Assignee: Tektronix, Inc., Wilsonville, Oreg.

[21] Appl. No.: 879,236

[22] Filed: May 6, 1992

[51] Int. Cl.$^5$ .......................................... H04N 17/02
[52] U.S. Cl. .................... 358/139; 324/404; 324/612
[58] Field of Search .............. 324/612, 404; 358/10, 358/139, 454; 356/374

[56] References Cited

PUBLICATIONS

"Moire Effects in the Reproduction of TV Signals by VTR Machines" by M. S. Tooms, C. Eng., M.I.E.E., M.I.E.R.E., pp. 4–10, vol. 13, No. 1, Jan./Feb. 1970 of The Royal Television Society Journal.
"Moire Effects in Professional Videotape Recorders", pp. 440–441, vol. 9 No. 19, Sep. 20, 1973 of Electronics Letters.

Primary Examiner—Kenneth A. Wieder
Assistant Examiner—Maura Regan
Attorney, Agent, or Firm—Francis I. Gray

[57] ABSTRACT

A Moire measurement system uses spectral analysis to characterize the moire effect on a television signal introduced by a particular device. A known television signal is processed by the particular device, such as a video tape recorder, and the output is input to a spectral analyzer, such a windowed fast Fourier transform. The spectral analyzer includes input gating to select a portion of the known television signal from the particular device. The frequency of the desired component of the known television signal, together with the rms values of all the other components introduced by the Moire effect, give the X- and Y-coordinates of a point on an output display. The window is moved across the test signal, giving a family of X- and Y-coordinates that characterize the Moire effect as a function of amplitude, frequency or video pedestal. The Moire characteristics of the particular device then may be used to correct the output of the particular device.

11 Claims, 1 Drawing Sheet

MOIRE MEASUREMENT SYSTEM USING SPECTRAL ANALYSIS

BACKGROUND OF THE INVENTION

The present invention relates to measurement of characteristics of a television system, and more particularly to a moire measurement system using spectral analysis to provide a display of moire error in a video signal.

Moire is a phenomenon that produces a spurious pattern in a reproduced television signal resulting from interference beats between two sets of periodic structures in the signal. In systems using a frequency modulated (FM) carrier, such as magnetic or video-disc record-playback systems, moire may be caused by interference between the upper sidebands of the FM carrier and the lower sidebands of harmonics of the FM carrier. As shown in FIGS. 1A and 1B if the video signal to be recorded has an input spectral component, f1, the playback signal has other spurious spectral components, such as f2. This moire signal degradation is one of the most significant in analog video tape recorders.

What is desired is a moire measurement system that gives an indication of the amount of moire error introduced into a video signal by a particular video device. The moire error may then also be compensated for to produce an error free video signal.

SUMMARY OF THE INVENTION

Accordingly the present invention provides a moire measurement system using spectral analysis by which the moire effect on a television signal by a particular device may be characterized. Once characterized the moire effect may be compensated for in the television signal output by the particular device. One or more television test signals are recorded, or processed, by the particular device and played back, or output, to check moire as a function of amplitude, frequency or video pedestal. The output from the particular device is input to a spectral analyzer and display processor combination, such as a windowed fast Fourier transform (FFT). The spectral analyzer includes input gating to select a portion of the test signal from the particular device. The frequency of the desired component of the test signal together with the rms values of all the other components give the X- and Y-coordinates of a point on an output display. The window is moved across the test signal, giving a family of X- and Y-coordinates that characterize the moire effect as a function of amplitude, frequency or video pedestal (d.c. level).

The objects, advantages and other features of the present invention are apparent from the following detailed description when read in conjunction with the appended claims and attached drawing.

DESCRIPTION OF THE PREFERRED EMBODIMENT

Figure 2:
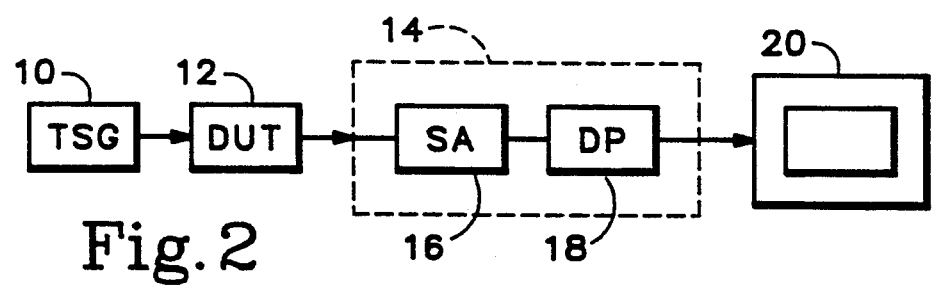
FIG. 2 is a block diagram of a moire measurement system according to the present invention.

Referring now to FIG. 2 a television test signal generator 10 outputs one or more test signals for processing by a device under test 12. The test signals may include an amplitude sweep signal having a constant frequency but a linearly increasing amplitude; a frequency sweep signal having a constant amplitude and linearly increasing frequency; a d.c. level sweep signal having a constant amplitude and frequency with the d.c. level increasing linearly; or any combination of these. The output of the device under test 12, including moire effects, is input to a measurement instrument 14 that incorporates a spectral analyzer 16 and a display processor 18. The output from the display processor 18 is input to a display device 20, or otherwise recorded for future use, to provide a display of the moire effect as a function of frequency, amplitude or d.c. level, commonly referred to as video pedestal.

Figure 1A:
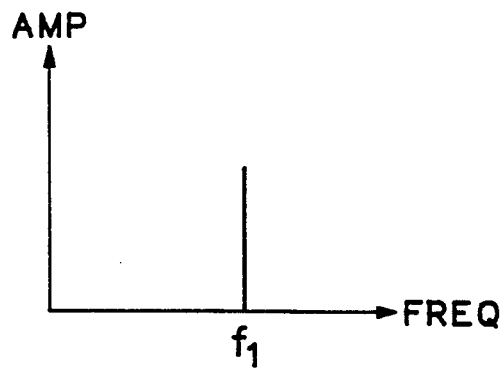
FIGS. 1A and 1B are spectral diagrams of a signal at the input and output of a particular device illustrating the moire effect.
Figure 1B:
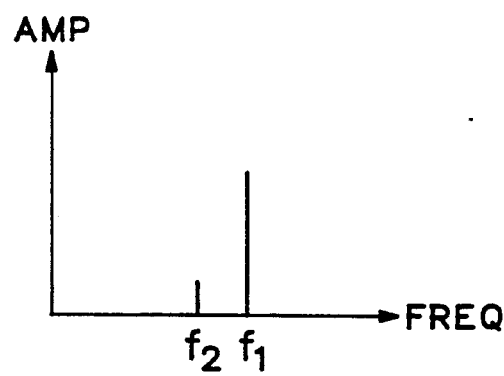
Figure 4A:
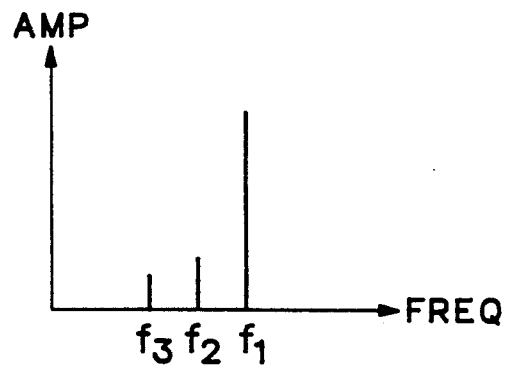
FIGS. 4A and 4B are spectral diagrams illustrating operation of the moire correction system.

In operation one or more of the test signals is input to the device under test 12, and then output to the measurement instrument 14. The spectral analyzer 16 includes input gating that produces a time window for acquiring a portion of the test signal from the device under test 12. The sampled data from the time "window" is converted to the frequency domain by the spectrum analyzer 16. As shown in FIG. 4A the spectrum of the selected portion of the test signal includes the desired signal, f1, and a number of moire components, f2, f3. The desired component of the test signal may be known from the test signal specification and window location, or may be assumed to be the largest spectral component within the window. The frequency of the desired component, f1, together with the rms values of all the other components, f2, f3, is processed by the display processor 18 to give X- and Y-coordinates of a point on the output display 20. As the window is moved across the test signal from the device under test 12 by the input gating of the spectrum analyzer 16, a family of X- and Y-coordinates is produced to provide a moire curve on the output display 20 as a function of frequency, amplitude or video pedestal.

Figure 4B:
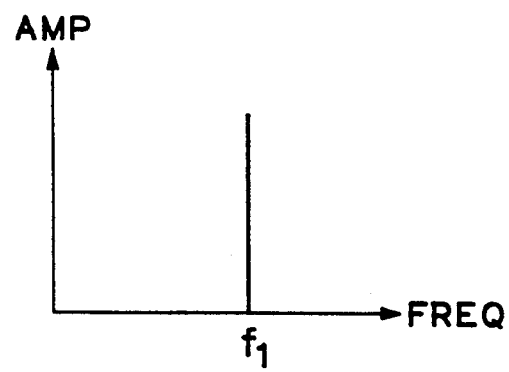
Figure 3:
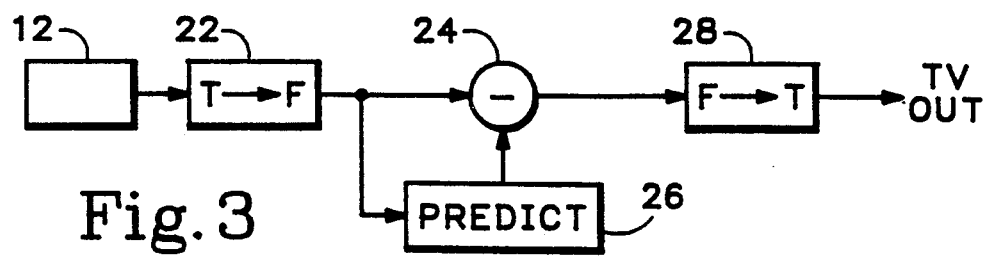
FIG. 3 is a block diagram of a moire corrector system using the results of the moire measurement system.

Once the moire characteristics of the device under test 12 are known, then they may be used in a moire correction system, as shown in FIG. 3, to subtract out the moire components from the television signal output from the device under test. The signal from the device 12 is input to a time to frequency converter 22 that converts the time domain signal to the frequency domain using a fast Fourier transform. The output of the time to frequency converter 22 is input to a moire subtractor 24 and to a spurious signal predictor 26 that includes a model of the device based upon the measured moire characteristics. The predictor 26 applies the predominant signal components in the signal to the model of the device 12 to estimate the error components out of the device. The output of the spurious signal predictor 26 is input to the moire subtractor 24 to subtract the moire components from the television signal. However the phase of the moire component may be difficult to predict and cancel using the subtraction process. Alternatively the error component cancellation may be implemented by setting that spectral component to zero. Although this results in some loss of detail, it is less objectionable than the moire effect. The result is converted back to the time domain by a frequency to time converter 28 using an inverse fast Fourier transform to produce an output television signal, as shown in FIG. 4B, that is corrected for moire.

Thus the present invention provides a moire measurement system using spectral analysis for determining the moire characteristics of a device in response to a known input test signal, which characteristics may then be used to subtract the moire components from the output of the device in normal operation in a moire corrector.

What is claimed is:

1. A moire measurement system for determining the moire characteristics of a device under test comprising:
   means for generating a known test signal, the known test signal being input to the device under test;
   means for analyzing a portion of the known test signal output by the device under test to produce a characteristic signal; and
   means for generating a display of the characteristic signal that shows moire error as a function of a desired characteristic representing all portions of the known test signal.

2. A moire measurement system as recited in claim 1 wherein the analyzing means comprises:
   a windowed spectral analyzer that sequentially processes successive time segments of the known test signal from the device under test to produce a spectrum for the known test signal within each time segment; and
   means for processing each spectrum to produce a sample point as a function of the desired characteristic that represents the moire error for that time segment, the totality of the sample points being the characteristic signal.

3. A moire measurement system as recited in claim 2 wherein the display generating means comprises means for displaying the sample points from the processing means as the moire error display according to the desired characteristic.

4. A method of characterizing the moire characteristics of a device under test comprising the steps of:
   generating a known test signal for input to the device under test;
   analyzing a portion of the known test signal output from the device under test to produce a characteristic signal; and
   generating a moire error display from the characteristic signal as a function of a desired characteristic representing all portions of the known test signal.

5. A method as recited in claim 4 wherein the analyzing step comprises the steps of:
   spectrally analyzing a time segment of the known test signal from the device under test corresponding to the portion to produce a spectrum;
   processing the spectrum to produce a sample point as a function of the desired characteristic that represents a moire error for the time segment; and
   repeating the spectrally analyzing and processing steps for each portion of the known test signal to produce a plurality of sample points, the plurality of sample points being the characteristic signal.

6. A method as recited in claim 5 wherein the moire error display generating step comprises the step of displaying the sample points as the moire error display according to the desired characteristic.

7. A moire correction system for a particular device comprising:
   means for converting a time domain output of the particular device to a frequency domain output;
   means for predicting a moire error signal from the frequency domain output and known moire error characteristics for the particular device;
   means in response to the moire error signal for canceling a moire error in the frequency domain output to a corrected frequency domain output; and
   means for converting the corrected frequency domain output to produce a corrected time domain output.

8. A method of correcting a time domain output from a particular device for moire errors comprising the steps of:
   converting a time domain output signal from the particular device to a frequency domain output signal;
   determining a moire error correction signal for the frequency domain output signal from a known moire error characteristic for the particular device in a correction predictor;
   applying the moire error correction signal to the frequency domain output signal to cancel the moire error to produce a corrected frequency domain output signal; and
   converting the corrected frequency domain output signal to a corrected time domain output signal.

9. A method as recited in claim 8 wherein the applying step comprises the step of subtracting the moire error correction signal from the frequency domain output signal to produce the corrected frequency domain output signal.

10. A method as recited in claim 8 wherein the applying step comprises the step of setting frequencies of the frequency domain output signal corresponding to the moire error correction signal to zero to produce the corrected frequency domain output signal.

11. A method as recited in claim 8 further comprising the steps of:
   characterizing the moire errors for the particular device by inputting to the particular device a known test signal and performing a spectral analysis at the output of the particular device to produce the moire error characteristic according to a desired characteristic; and
   storing the moire error characteristic in the correction predictor.

* * * * *